United States Patent [19]

Avaro et al.

[11] 4,123,386
[45] Oct. 31, 1978

[54] CHEMICALLY REDUCING SOLIDS WHICH MAY BE APPLIED TO THE POLYMERIZATION OF OLEFINS

[76] Inventors: Michel M. Avaro, "Rendence les Esperelles" 33 Bd des Esperelles; Pierre M. Mangin, "Le Megaran" Bd Girard Philipe, both of 13500 Martigues, France

[21] Appl. No.: 748,947

[22] Filed: Dec. 9, 1976

Related U.S. Application Data

[62] Division of Ser. No. 595,770, Jul. 14, 1975, abandoned.

[30] Foreign Application Priority Data

Aug. 14, 1974 [FR] France .................. 74 28207

[51] Int. Cl.$^2$ .......................... C08F 4/64; C08F 4/68; C08F 4/62
[52] U.S. Cl. ................. 252/429 B; 526/151; 526/159; 526/169
[58] Field of Search ............. 526/151, 159, 169; 252/429 B

[56] References Cited

U.S. PATENT DOCUMENTS

| | | | |
|---|---|---|---|
| 3,878,124 | 4/1975 | Durand et al. | 252/429 B |
| 3,922,322 | 11/1975 | Roger et al. | 252/429 B X |

OTHER PUBLICATIONS

Lapporte et al., J. Org. Chem. 28, (Jul. 1963), pp. 1947–1948.

Primary Examiner—Patrick Garvin
Attorney, Agent, or Firm—McDougall, Hersh & Scott

[57] ABSTRACT

An olefin polymerization catalyst is prepared in two steps. In the first step, a chemically reducing solid is prepared by polymerizing an olefin in contact with solid particles of a compound of a transition metal from sub-groups IV A, V A and VI A in a lower valency state in the presence of an organomagnesium compound and terminating the polymerization when the quantity of olefin polymerized is from 50 mg.–50 g. per mg-atom of transition metal. In the second step, the chemically reducing solid prepared in the first step is contacted with reducible compounds of transition metals from sub-groups IV A, V A and VI A to effect reduction thereof.

20 Claims, No Drawings

CHEMICALLY REDUCING SOLIDS WHICH MAY BE APPLIED TO THE POLYMERIZATION OF OLEFINS

This is a division of U.S. application Ser. No. 595,770 filed June 14, 1975 with the same title, now abandoned.

The invention relates to chemically reducing agents; in granule form, containing organic magnesium compounds. It also relates to the application of these reducing agents to the preparation of catalysts for use in the manufacture of polyolefines.

Since the work done by Victor GRIGNARD, it has been known to prepare organic magnesium compounds by reacting metallic magnesium with a monohalogenated organic compound. This is generally done in an ether which activates the reaction and exerts a solubilizing action on the organic magnesium compounds formed. However, solid organic magnesium compounds can be obtained by the above-mentioned method by operating in a liquid saturated hydrocarbon, either in the absence of ether or with the ether being separated after the formation of the magnesium compounds. The solid organic magnesium compounds are in the form of particles of very varied shapes and dimensions.

Applicants have observed that in some applications, and particularly in the manufacture of catalysts for polyolefines, it is advantageous to use reducing compounds of the organic magnesium type; comprising particles of uniform dimensions and of a specific shape; particularly spherical. It has been found that these reducing agents with a specific structure can be prepared by polymerising olefines in contact (a) with solid compounds of transition metals and (b) with organic magnesium compounds.

The subject matter of the invention is thus the chemically reducing solids obtained by polymerising an olefine of the formula $ACH = CH_2$, wherein A is a hydrogen atom or an aliphatic radical containing 1 to 8 carbon atoms, in contact (a) with solid particles comprising a compound of a transition metal from sub-groups IV$a$, V$a$ and VI$a$ of the Periodic Table and (b) with an organic magnesium compound.

The transition metals from sub-groups IV$a$, V$a$ and VI$a$ of the Periodic Table, referred to in the above paragraph, comprise titanium, vanadium, chromium, zirconium, niobium, hafnium, tantalum and tungsten. The classification can be extended to include thorium and uranium.

The above-mentioned solid particles of the transition metal compound may be obtained in any known manner. In particular they may be prepared by reducing a compound of a transition metal with an initial valency of at least four, either liquid or dissolved in a non-reactive solvent. The compound may be reduced by an organometallic compound, such as an organic aluminum compound. It is generally advantageous to agitate the liquid medium in which reduction takes place, so as to obtain solid particles with a narrow range of particle sizes.

It is also possible for the transition metal compound to be reduced by a reducing agent such as an alkali metal, an alkaline-earth metal or aluminum. The solid particles of transition metal thus obtained may be used directly to prepare the reducing agents according to the invention; alternatively they may undergo preliminary physical or chemical treatment, e.g. to alter their shape.

The solid particles of the transition metal compound are preferably compounds of trivalent titanium of the formula $Ti(OR)_n X_{3-n}$, wherein R represents a univalent hydrocarbon radical (alcoyle) containing 2 to 8 carbon atoms, X an atom of a halogen, generally chlorine, and $n$ a whole number or fraction which may have any value from 0 to 3. The particles based on trivalent titanium are advantageously prepared by reducing tetravalent titanium compounds by means of organometallic, e.g. organic aluminum compounds, the tetravalent titanium compounds being of the formula $Ti(OR)_n X_{4-n}$, wherein R represents a univalent hydrocarbon radical which may contain from 2 to 8 carbon atoms, X a halogen atom, generally chlorine, and $n$ a whole number or fraction which may have any value from 0 to 4. The tetravalent titanium compounds may comprise titanium tetrachloride, a tetratitanate of a univalent hydrocarbon radical or a chlorotitanate of a univalent hydrocarbon radical obtained by a functional inter-change reaction between the titanium tetrachloride and a tetratitanate of a univalent hydrocarbon radical. The solid particles of the trivalent titanium compound, obtained as described above, are in the form of substantially spherical particles of an average diameter generally from 1 to 40 microns. The particles are protected from air and humidity; e.g. in a non-reactive liquid hydrocarbon, such as n-heptane.

The organic magnesium compounds are preferably compounds of magnesium and hydrocarbon radicals in which the magnesium is directly bonded to at least one carbon atom. The compounds may be obtained in any known manner, usually by the Grignard method, which comprises reacting magnesium in the metallic state with a monohalogenated organic derivative of the formula R'—X, wherein R' represents a hydrocarbon radical, such as a univalent (alcoyle) group containing 1 to 12 carbon atoms and X represents a halogen atom, generally chlorine or bromine. The Grignard reaction is normally carried out in the presence of an ether, such as ethoxy-ethane. The formula for the organic magnesium halides is generally written in the conventional way as R'—Mg—X. These compounds then consist at least partially of etherates which may be dissolved in an excess of ether. Before these organic magnesium compounds, which are solvated by ether, are used in preparing the reducing agents according to the invention, it is preferable for them to be separated from the solvating ethers, e.g. in a preliminary heating step.

The organic magnesium compounds may also be prepared directly in a non-solvated form by reacting metallic magnesium with a monohalogenated organic compound. The reaction takes place in a non-polar solvent, such as a liquid hydrocarbon, in the absence of polar solvents, such as ethers which might solvate the organic magnesium compounds. It may be initiated by catalytic quantities of an activating agent, such as iodine. The non-solvated organic magnesium compounds thus obtained are generally almost insoluble in the solvent in which they were prepared. They are accordingly in the form of suspended particles which may either be used in that form or after being separated from the solvent.

The organic magnesium compounds may equally be of the formula R'—Mg—R", wherein R' and R" represent hydrocarbon radicals which may be identical or different, such as alkyl (alcoyles) or aryl radicals containing 1 to 12 carbon atoms. These compounds; which are commonly known as symmetrical organic magnesium compounds, may be obtained e.g. from organic lithium compounds by one of the two following reactions:

$$R'-Mg-X + R''Li \rightarrow R'-Mg-R'' + LiX \quad (1)$$

$$\text{or } 2R'-Li + MgX_2 \rightarrow R'-Mg-R' + 2LiX \quad (2)$$

Symmetrical organic magnesium compounds may equally be prepared from composite organic magnesium compounds by the reaction:

$$2R'-Mg-X \rightarrow R'-Mg-R' + MgX_2 \quad (3)$$

The symmetrical organic magnesium compounds may then be isolated when the formed lithium or magnesium halides have separated. They are generally almost insoluble in non-polar solvents unless they are solvated by ethers.

The reducing agents, according to the invention, can conveniently be prepared in a non-reactive liquid, such as a liquid saturated aliphatic hydrocarbon or a mixture of such hydrocarbons. The operation is carried out in a closed reactor provided with a mechanical agitator and heating and/or cooling means. The solid particles of transition metal compound and the organic magnesium compound are fed into the reactor in proportions such that the molar ratio of organic groups of the organic magnesium compound to transition metal are from 0.2 to 20/1. The olefine, which has to be polymerised, is fed into the reactor at from 0.01 to 100 g per hour per milligram-atom of transition metal, and the temperature of the reaction medium is kept between 40° and 150° C. Hydrogen may also be introduced into the reactor, for example, up to a pressure of 10 bars. The operation is stopped when the quantity of olefine polymerised is from 50 mg to 50 g per milligram-atom of transition metal.

The granules which form during polymerisation have a shape similar to the solid particles of transition metal compound. Their size depends chiefly on the quantity of olefine polymerised. The enlargement of the particles may be followed by observing samples of the reaction medium under a microscope; the operation is stopped when the particles reach the desired dimensions.

In a modified embodiment, the reducing agents according to the invention are prepared by replacing the organic magnesium compound with an equal molar quantity of magnesium and of a monohalogenated hydrocarbon, such as a chloride or bromide of a univalent hydrocarbon radical (alcoyle) containing 1 to 12 carbon atoms.

In another modified embodiment, which applies particularly to cases where organic magnesium halides are used, reducing agents according to the invention may be prepared by replacing the olefine with a halide of a univalent hydrocarbon radical (alcoyle) of the formula R'''—CH$_2$X, wherein R''' represents a univalent hydrocarbon radical containing 1 to 10 carbon atoms and X an atom of a halogen, preferably chlorine. The halide is used, relative to the organic magnesium compound, in quantities such that the molar ratio R'''/organic magnesium compound is from 0.1 to 0.9/1. Although no conclusive explanation of the phenomenon can be given; it is believed probably that the halide of the univalent hydrocarbon radical reacts with part of the organic magnesium compound to form an olefine, by a dismutation reaction, such as the following reaction between ethyl chloride and ethyl magnesium chloride:

$$C_2H_5Cl + C_2H_5MgCl \rightarrow MgCl_2 + C_2H_4 + C_2H_6$$

The reducing agents thus obtained by any of the various methods described above may be isolated from the medium in which they were formed. They are preferably washed with an inert solvent such as a liquid saturated hydrocarbon e.g. so as to eliminate any soluble compounds, such as ethers, which they may contain. It is also possible for the reducing agents to be subjected to one or more extracting processes with liquid saturated hydrocarbons at a temperature of from 25° to 110° C., so as to eliminate the soluble polymer fractions and thereby create pores inside the reducing agents.

The reducing agents according to the invention have the reducing properties of the organic magnesium compounds from which they are obtained. These properties may be revealed by specific reactions involving the organic magnesium compounds. For example, compounds with a mobile hydrogen atom, such as halogenated hydracids or alcohols, cause an alkane to form by well-known reactions of organic magnesium compounds. The reducing properties of the substances according to the invention may be quantitatively defined by their reducing power relative to titanium tetrachloride. This power "p" is equal to the number of millimoles of titanium tetrachloride reduced in 1 hr, at 60° C., by 1 g of reducing agent.

The reducing agents according to the invention are advantageously used in the manufacture of catalysts for polymerising olefines. Like the reducing agents from which they are prepared, the catalysts are then in the form of solid granules. In particular, when the reducing agents are obtained from small spheres of titanium trichloride, the catalysts are also in the form of spherical particles of regular dimensions. The polymers obtained from these catalysts also have a regular shape and a narrow range of particle sizes, which gives them advantageous flow properties.

The reducing agents according to the invention may be used in different ways in the manufacture of catalysts for polymerising olefines. One of these various applications comprises reducing a compound of a transition metal from sub-groups IV$a$, V$a$ and VI$a$ of the Periodic Table, as defined above; with reducing agents according to the invention. In this way, it is possible to reduce the above-mentioned tetravalent titanium compounds of the formula Ti(OR)$_n$X$_{4-n}$ to trivalent titanium compounds. In this case, the reduced compounds of transition metals are included in the small spheres of reducing agent from which they were prepared; no separate formation of solid particles of reduced transition metal compounds is observed.

The reaction between reducing agents according to the invention and transition metal compounds is advantageously carried out at from −10° to 100° C. with a quantity of reducing agent, expressed in grams per milligram-atom of transition metal, of from 1/10P to 10/P, P being the reducing power defined above. When the quantity is from 1/P to 10/P it is preferable to destroy the residual reducing power, e.g. by treating the catalyst with an excess of a halide of a univalent hydrocarbon radical (alcoyle) of the formula R$^{IV}$—CH X, wherein R$^{IV}$ represents a univalent hydrocarbon radical containing 1 to 10 carbon atoms and X represents an atom of a halogen, such as chlorine.

It is also possible for the reducing agent to undergo preliminary chemical conversion before being used. The chemical conversion may e.g. result from a reaction between a hydroxyl compound, such as water or an aliphatic alcohol, and the reducing agent. The reaction should advantageously take place at from 0 to 100° C. in the case of water or at from −40° to 100° C. in the case of alcohols, in a non-reactive liquid, such as a hydrocarbon or a mixture of aliphatic hydrocarbons, the quantity of hydroxyl compound being from 0.05 P to P millimoles per gram of reducing agent. The solid resulting from the preliminary treatment can then be applied to the manufacture of catalysts for polymerising olefines, by bringing the converted solid into contact with transition metal compounds in the manner described above.

Catalysts prepared from reducing agents according to the invention have a very good catalytic action in polymerising olefines, either in the presence of a liquid dispersing agent or in the gaseous phase. The catalysts may be used in the polymerisation or copolymerisation of olefines, such as ethylene and/or olefines of the formula $CH_2 = CHA$, wherein A represents a univalent hydrocarbon radical (alcoyle) with 1 to 8 carbon atoms. In this type of polymerisation, the catalysts are preferably associated with co-catalysts selected from organo-metallic compounds of metals from groups II and III of the Periodic Table, such as organic aluminium compounds of the general formula $AlR_m^{\prime}X_{3-m}$, wherein $R^{\prime}$ represents a univalent hydrocarbon group with 1 to 10 carbon atoms, X represents an atom of hydrogen or of a halogen, preferably chlorine, and $m$ represents a whole number or fraction which may have any value from 1 to 3. The co-catalysts are advantageously used in quantities such that the molar ratio: Metals from groups II and III in the co-catalysts/Transition metals from sub-groups IVa, Va and VIa in the catalysts, is from 1 to 50/1.

The catalysts can be applied, particularly to the polymerisation of olefines, by the so-called "low pressure" method, which generally comprises operating at a pressure below 20 bars and at a temperature of from 40° to 150° C. Polymerisation may take place in a liquid in which the catalyst is dispersed, in which case the liquid may e.g. be the liquefied monomer or a saturated aliphatic hydrocarbon; alternatively, polymerisation may take place in the gaseous phase without any liquid diluent. During polymerisation it is possible to adjust the average molecular weight of the polymer formed; by means of a chain limiting agent, such as hydrogen, in molecular proportions generally from 10 to 80% relative to the olefine to be polymerised. Polymerisation is stopped when the polymer reaches the desired average molecular weight, which is generally from 50,000 to 1,000,000 in the case of polymers for the purposes to which thermoplastic materials are usually applied, or generally from 10,000 to 200,000 in the case of polyolefine waxes. Because of the strong action of the catalysts prepared from the reducing agents according to the invention, the polymers obtained contain only very small quantities of transition metals and can generally be applied to the desired purpose without having to undergo any purifying treatment.

EXAMPLE 1

Preparation of a reducing agent.

Propoxychlorotitanium and ethylmagnesium chloride are prepared separately:

(a) Propoxychlorotitanium

A 5 liter stainless steel reactor, equipped with a mechanical agitator and a means for heating or cooling, such as a double-jacket, is previously filled with dry nitrogen, then the following are fed in under nitrogen:

1 liter of dry n-heptane,
95 g (500 m.moles) of titanium tetrachloride and
142 g (500 m.moles) of n-propyl tetratitanate.

When the contents of the flask have been brought to 40° C. with agitation, 144 g (1.2 moles) of diethylaluminium chloride is added in the course of three hours. Agitation is continued for 2 hours at 60° C. then the precipitate formed is separated by decanting. The decanted solid is washed 3 times with 1 liter of dry n-heptane. It consists of substantially spherical particles from 15 to 30 microns in diameter.

(b) Ethylmagnesium chloride

A 5 liter stainless steel reactor, equipped with a mechanical agitator and a means for heating or cooling, as by a double-jacket, is previously filled with dry nitrogen, then the following are fed into it:

1 liter of dry n-heptane,
48.6 g (2 g-atoms) of powdered magnesium,
12.9 g (200 m.moles) of dry ethyl chloride and one iodine crystal.

The contents of the flask are brought to 60° C. with agitation. When the organic magnesium compound begins to form (this is revealed by an increase in pressure), 116.1 g (1.8 moles) of additional dry ethyl chloride is gradually added in the course of 60 minutes, and the temperature of the liquid contained in the flask is kept at 60° C.

The formed ethylmagnesium chloride is in the form of needles and filings of various shapes and sizes, with an average length of about 30 microns. The ethylmagnesium chloride is kept in the liquid in which it was prepared.

(c) Preparation of reducing agent

A 5 liter stainless steel reactor, equipped with a mechanical agitator and a means for heating or cooling, as by a double-jacket, is previously filled with dry nitrogen and the following are fed into it:

2 liters of dry n-heptane,
36 g (200 m.moles) of the propoxychlorotitanium prepared in (a) and
178 g (2 moles) of the ethylmagnesium chloride prepared in (b).

The contents of the flask are heated to 80° C., then hydrogen is introduced until the relative pressure reaches 4 bars, after which ethylene is introduced at a rate of 80 g/hr. After a reaction lasting one and a half hours, the reactor is purged and the small spheres obtained are washed with 500 ml of n-heptane. When the spheres have been separated by decanting, the washing is repeated 3 times. 350 g of spheres are obtained, of about 45 microns in diameter. These are kept in n-heptane, protected from air and humidity.

The reducing power of the small spheres is measured as follows:

100 g of spheres is placed in 190 g of titanium tetrachloride. The suspension is heated under nitrogen to 60° C. for 1 hour, in a flask equipped with a reflux condenser. The solid is separated by decanting then the tetravalent titanium is dosed into the supernatant liquid by oxidimetry. 95 g of titanium tetrachloride (500 m.moles) is found not to have reacted; the reducing power is thus:

$$P = (1,000 - 500)/100 = 5$$

EXAMPLE 2

Preparation of a catalyst for polymerising olefines.

(a) A 5 liter stainless steel reactor, equipped with a mechanical agitator and a means for heating or cooling by double-jack, is previously filled with dry nitrogen, then 150 g of the spheres prepared in example 1(c) is introduced, in suspension in 1 liter of n-heptane. The reactor is closed and its contents heated to 80° C., then 118.5 g (0.5 mole) of dipropoxydichlorotitanium dissolved in 500 ml of n-heptane is added over 15 minutes. Heating of the suspension is continued at 80° C. for 2 hours. 32.25 g (0.5 mole) of ethyl chloride is then added over 30 minutes and heating of the suspension is continued for 3 hours at 80° C. The solid particles are then separated by decanting and washed 5 times by decanting with 500 ml of n-heptane.

The catalyst thus obtained is in the form of small spheres about 60 microns in diameter. It is kept in n-heptane, protected from air and humidity.

(b) The catalyst prepared in (a) above is used as follows for polymerising ethylene A 5 liter stainless steel reactor, equipped with a mechanical agitator and a means for heating and cooling by a double-jacket, is previously filled with dry nitrogen then the following are successively fed into it:

2 liters of dry n-heptane, 0.6 g of the catalyst, containing 48 mg of titanium 0.8 g (4 m.moles) of triisobutylaluminium.

The temperature is set to 80° C. and hydrogen is introduced to a relative pressure of 3 bars, after which ethylene is fed in at 160 g/hr. The reaction is stopped after 8 hours; the relative total pressure never having exceeded 8 bars. When the n-heptane has been carried away by steam, and the polymer dried, 1280 g of a polyethylene containing 40 ppm (parts by weight per million) of titanium is obtained. The polyethylene consists of spherical granules of an average diameter of 600 microns. The granules are very homogeneous in size and the quantity of particles smaller than 125 microns in diameter is only 3% by weight. The apparent mass per unit volume AMV) of the polyethylene is 400 g/liter.

EXAMPLE 3

The procedure of example 2 is followed, except that the catalyst is prepared from 88.8 g (1 mole) of the ethylmagnesium chloride prepared in example 1(b), instead of the spheres obtained in example 1(c).

The catalyst thus prepared is used as in example 2(b). After 8 hours' polymerisation 1280 g of a polyethylene is obtained, which is treated as in example 2(b). The polyethylene contains 40 ppm of titanium. It consists of granules of irregular shapes and varying sizes. The quantity of particles smaller than 125 microns is 10% by weight and the AMV is 350 g/liter.

EXAMPLE 4

Preparation of a converted reducing agent

A 5 liter stainless steel reactor, equipped with a mechanical agitator and a means for heating or cooling by a double-jacket, is previously filled with nitrogen then 350 g of the small spheres prepared in example 1(c) is introduced, in suspension in 1 liter of n-heptane. The contents of the reactor are kept at 25° C. and 9 g of water is introduced in the course of 30 minutes. The converted reducing agent is kept in the medium in which it was prepared, protected from air and humidity.

EXAMPLE 5

Preparation of a catalyst for polymerising olefines.

(a) A 5 liter stainless steel reactor, equipped with a mechanical agitator and a means for heating and cooling by a double-jacket, is previously filled with dry nitrogen then the converted substance obtained in example 4 is fed into it, in suspension in n-heptane, together with 380 g (2 moles) of titanium tetrachloride in solution in 2 liters of n-heptane. The contents of the flask are agitated at 80° C. for 4 hours. The catalyst thus prepared is washed with n-heptane, as in example 2(a).

(b) The same polymerising operation as in example 2(b) is carried out, with the catalyst prepared in (a). After 6 hours' polymerization 1300 g of a polyethylene is obtained, with the same physical properties as that prepared in example 2(b).

EXAMPLE 6

Preparation of a converted reducing agent

The same experiment as in example 4 is carried out, except that 37 g (0.5 mole) of n-butanol is used instead of water.

EXAMPLE 7

Preparation of a catalyst for polymerising olefines

The experiment in example 5(a) is reproduced with the converted substance from example 6.

The catalyst is used for polymerising ethylene as described in example 5(a).

1280 g of a polyethylene is obtained, with the same physical properties as that prepared in example 2(b).

We claim:

1. A method for preparing catalysts for polymerizing olefins, comprising two successive main steps, the first step comprising the preparation of chemically reducing solids by polymerizing an olefin of the formula ACH = $CH_2$, wherein A is hydrogen or an alkyl radical containing 1 to 8 carbon atoms, in contact with solid particles of a compound of a transition metal from sub-groups IV$a$, V$a$ and VI$a$ of the periodic table in a lower valency state, and in the presence of an organomagnesium compound in the form of a $C_1$-$C_{12}$ alkyl magnesium compound in the relative proportion such that the molar ratio of organic groups of the alkyl magnesium compound to the transition metal is 0.2–2.0/1, and the second step comprising contacting the chemically reducing solids from the first step with reducible compounds of transition metals from sub-groups IV$a$, V$a$ and VI$a$ of the periodic table to effect reduction thereof, terminating the polymerization in the first step when the quantity of olefin polymerized is from 50 mg.–50 g. per mg.-atom of transition metal.

2. A method according to claim 1, in which the solid particles of a transition metal compound used in the first step are previously obtained by reducing a transition metal compound having an initial state of valency of at least four.

3. A method according to claim 2, in which the solid particles of a transition metal compound comprise a trivalent titanium compound of the formula Ti-(OR)$_n$X$_{3-n}$, wherein R represents an alkyl group containing 2 to 8 carbon atoms, X represents an atom of a halogen, and n a whole number or fraction which may have any value of from 0 to 3, and in which said compound is obtained by reducing a transition metal compound having an initial state of valency of at least four, by means of an organoaluminum compound.

4. A method according to claim 3 in which the organoaluminum compound is represented by the general formula $AlR_m^V X_{3-m}$ wherein $R^V$ represents a univalent hydrocarbon group with 1 to 10 carbon atoms, X represents an atom of hydrogen or of a halogen, and $m$ represents a whole number or fraction which may have any value from 1 to 3.

5. A method according to claim 3, in which the halogen is chlorine.

6. A method according to claim 1, in which the organomagnesium compound used in the first step is of the formula R'MgX, wherein R' represents a hydrocarbon radical containing 1 to 12 carbon atoms and X represents an atom of a halogen.

7. A method according to claim 6, in which the halogen is selected from the group consisting of chlorine and bromine.

8. A method according to claim 1, in which the organomagnesium compound used in the first step is of the formula R'MgR'', wherein R' and R'' represent identical or different hydrocarbon radicals containing 1 to 12 carbon atoms.

9. A method according to claim 1, comprising feeding the solid particles of transition metal compound and the organomagnesium compound into a reactor, containing a non-reactive liquid, keeping the reactor at from 40° to 150° C. and feeding the olefin, which has to be polymerized, into it at a rate of 0.01 to 100 g per hour per milligram atom of transition metal, until from 50 mg to 50 g of olefin per milligram atom of transition metal is polymerized; reacting the chemically reducing solids with transition metal compounds from sub-groups IVa, Va and VIa of the periodic table at from −10° to 100° C.

10. A method as claimed in claim 9 in which the non-reactive liquid is a saturated aliphatic hydrocarbon.

11. A method as claimed in claim 9, comprising replacing the organomagnesium compound with an equal molar quantity of magnesium and of an alkyl monochloride in which the alkyl group contains 1 to 12 carbon atoms.

12. A method as claimed in claim 9, comprising replacing the organomagnesium compound with an equal molar quantity of magnesium and of an alkyl monobromide in which the alkyl group contains 1 to 12 carbon atoms.

13. A method according to claim 1, comprising feeding the solid particles of the compound of a transition metal and the organomagnesium compound into a reactor, containing a non-reactive liquid, keeping the reactor at from 40° to 150° C. and feeding into it 0.1 to 0.9 moles, per mole of organomagnesium compound, of a hydrocarbon halide of the formula $R'''-CH_2X$ wherein R''' represents an alkyl group containing 1 to 10 carbon atoms and X represents an atom of a halogen; reacting the chemically reducing solids with transition metal compounds from sub-groups IVa, Va and VIa of the periodic table at from −10° to 100° C.

14. A method as claimed in claim 13, in which the halogen is chlorine.

15. A method as claimed in claim 13, in which the non-reactive liquid is a liquid saturated aliphatic hydrocarbon.

16. A method as claimed in claim 13, comprising replacing the organomagnesium compound with an equal molar quantity of magnesium and of an alkyl monochloride in which the alkyl group contains 1 to 12 carbon atoms.

17. A method as claimed in claim 13, comprising replacing the organomagnesium compound with an equal molar quantity of magnesium and of an alkyl monobromide in which the alkyl group contains 1 to 12 carbon atoms.

18. A method as claimed in claim 1, wherein the transition metal compounds used in the second step are titanium compounds of the formula $Ti(OR)_n X_{4-n}$, wherein R represents an alkyl group containing 2 to 8 carbon atoms, X an atom of a halogen, and $n$ a whole number or fraction which may have any value from 0 to 4.

19. A method as claimed in claim 1 in which the quantity of reducing agent employed in the second step, expressed in grams per milligrams atom of transition metal is 1/10 P to 10 P in which P is the number of millimoles of titanium tetrochloride reduced in one hour at 60° C. by 1 gram of reducing agent.

20. A catalyst for polymerizing olefins as prepared in the preceding claim 1.

* * * * *